US010065900B2

(12) United States Patent
Mathur

(10) Patent No.: US 10,065,900 B2
(45) Date of Patent: Sep. 4, 2018

(54) HIGH VOLUMETRIC ENERGY DENSITY ROCKET PROPELLANT

(71) Applicant: Johann Haltermann Limited, Houston, TX (US)

(72) Inventor: Indresh Mathur, Sugar Land, TX (US)

(73) Assignee: Johann Haltermann Limited, Houston, TX (US)

( * ) Notice: Subject to any disclaimer, the term of this patent is extended or adjusted under 35 U.S.C. 154(b) by 109 days.

(21) Appl. No.: 15/157,935

(22) Filed: May 18, 2016

(65) Prior Publication Data

US 2017/0183273 A1   Jun. 29, 2017

Related U.S. Application Data

(60) Provisional application No. 62/169,854, filed on Jun. 2, 2015.

(51) Int. Cl.
| | |
|---|---|
| *C06B 43/00* | (2006.01) |
| *C06B 25/20* | (2006.01) |
| *F02K 9/42* | (2006.01) |
| *C06B 23/00* | (2006.01) |
| *C06D 5/08* | (2006.01) |

(52) U.S. Cl.
CPC .............. *C06B 43/00* (2013.01); *C06B 23/00* (2013.01); *C06B 25/20* (2013.01); *C06D 5/08* (2013.01); *F02K 9/42* (2013.01)

(58) Field of Classification Search
CPC ......... C06B 43/00; C06B 23/00; C06B 25/20; C06D 5/08; F02K 9/42
See application file for complete search history.

(56) References Cited

U.S. PATENT DOCUMENTS

| | | | | |
|---|---|---|---|---|
| 3,230,700 | A * | 1/1966 | Larsen | C06B 23/007 149/74 |
| 2008/0178523 | A1 * | 7/2008 | Ahlers | C10L 1/1973 44/388 |
| 2013/0253237 | A1 * | 9/2013 | Mathur | F02K 9/42 585/14 |

FOREIGN PATENT DOCUMENTS

WO     WO2012068369     5/2012

OTHER PUBLICATIONS

International Search Report and Written opinion dated Jan. 5, 2017, Form PCT/ISA/220, 10 pages.

(Continued)

*Primary Examiner* — Aileen Baker Felton
(74) *Attorney, Agent, or Firm* — Butzel Long; Gunther J. Evanina

(57) ABSTRACT

A rocket propellant includes a hydrocarbon blend having a total aromatic compounds content less than 0.5 mass percent, a specific energy of at least 18.4 KBtu/lb, and a mass density of at least 0.8150 grams per cubic centimeter. The propellant, which can be prepared by blending a refined kerosene with an isoparaffin and/or a cycloparaffin, exhibits a high volumetric heat of combustion and excellent thermal stability. This combination of properties is especially useful for fueling reusable launch vehicles employing regenerative cooling of engine components.

11 Claims, 4 Drawing Sheets

(56) References Cited

OTHER PUBLICATIONS http://ursula.chem.yale.edu/~chem220/chem220js/STUDYAIDS/movies/decalins.html, How to manipulate JSmol structures), trans- and cis-Decalin, dated Jul. 7, 2017, 2 pages.
Isododecane, Technical Data Sheet, INEOS Oligomers, Mar. 2016, 1 page.
Jet Fuels JP-4 and JP-7, 3. Chemical and Physical Information, 12 pages.

* cited by examiner

HIGH VOLUMETRIC ENERGY DENSITY ROCKET PROPELLANT

CROSS-REFERENCE TO RELATED APPLICATIONS

This application claims the benefit of U.S. Provisional Application No. 62/169,854, filed Jun. 2, 2015, which is incorporated herein by reference.

FIELD OF THE DISCLOSURE

Disclosed are rocket propellants having a high hydrogen content and a high heat of combustion.

BACKGROUND OF THE DISCLOSURE

The named inventor in this application, Indresh Mathur, has been issued U.S. Pat. No. 9,005,380, which discloses and claims rocket propellants having a density of about 0.76 grams/cm$^3$ to about 0.78 grams/cm$^3$. The fuels disclosed in U.S. Pat. No. 9,005,380 had a high hydrogen content and consequently had a high heat of combustion on a mass basis (i.e., high energy content per unit of mass). These high mass energy density fuels have the advantage of reducing the mass of fuel needed to achieve a desired specific impulse (i.e., thrust per unit mass of fuel per unit of time). However, the advantage of higher mass energy density is not fully realized in rocket propellant applications because of the somewhat lower mass density or specific gravity of these fuels as compared with conventional rocket fuels such as RP-1 which has a mass density of 0.7990 to 0.8150 grams/cm$^3$.

The mass of a lower mass density fuel, as described in U.S. Pat. No. 9,005,380, that can be contained in the fuel tank of a predetermined launch vehicle is less than the mass of conventional fuel (e.g., RP-1) that can be held in the same tank. This means that a substantial amount of the additional total energy available due to the higher amount of energy per unit mass of fuel is lost due to a reduction of total fuel mass that can be held in a given tank of a predetermined launch vehicle.

From the available technical literature, it would appear that for hydrocarbon fuels having a low aromatic content (needed to prevent fouling and fuel degradation in rocket engines employing regenerative cooling), there is a trade-off between specific energy of the fuel (the amount of energy released per unit mass of fuel during combustion) and the mass density of the fuel (the mass of fuel per unit of volume of the fuel). In other words, attempts at increasing the specific energy tend to reduce mass density, and attempts to increase mass density tend to reduce the specific energy of the fuel.

U.S. Pat. No. 9,005,380 discloses a hydrocarbon rocket fuel having a low concentration of aromatic compounds (less than 5% by volume) that is beneficial for reusable launch vehicles (and for certain reusable air-breathing hypersonic vehicles) in which the fuel is used as a coolant to transfer heat from rocket engine components, such as the combustion chamber and nozzle of a rocket engine. In such case, the fuel is passed through small diameter tubes or channels around the combustion chamber or nozzle of the engine. Such process is termed "regenerative cooling." It is important that fuels used in a regenerative cooling process exhibit extraordinarily good thermal stability, i.e., that they are highly resistant to thermal degradation. Thermal degradation of a hydrocarbon fuel during regeneration cooling is undesirable because it increases the pressure drop through the tubes or channels of the combustion chamber or in the engine nozzle or other components where carbon accumulates on the tube or channel walls. Accumulation of thermal degradation products (fouling) on the regenerative cooling tubes or channels also adversely affects the overall heat transfer coefficient. Higher pressure drop and lower heat transfer rates reduce the rate of heat transfer, resulting in increased temperatures, which in turn results in an increased rate of thermal degradation of the fuel. Thus, even fuels that are generally considered to exhibit good thermal stability can cause fouling of the regenerative cooling tubes that occurs at an ever increasing rate during operation of a rocket engine, potentially leading to catastrophic failure.

SUMMARY OF THE DISCLOSURE

Disclosed are rocket fuels having a high volumetric heat of combustion, facilitating higher total thrust from the amount of fuel that can be contained in a given fuel tank. The rocket fuels disclosed herein also have a low aromatics content to provide excellent thermal stability that is useful for applications involving regenerative cooling of rocket engine components.

The fuels disclosed herein are characterized by a total aromatic compounds content less than 0.5 mass percent, a specific energy or at least 18.4 KBtu/lb, and a mass density greater than 0.8150 grams per cubic centimeter.

In certain aspects of this disclosure, the fuels have a high cycloparaffin content, such as at least 60 mass percent.

In certain aspects of this disclosure, the fuels have a sulfur content less than 1 ppm by mass.

In accordance with certain embodiments, fuels can be prepared by blending a refined kerosene with at least one isoparaffin, at least one cycloparaffin, or at least one isoparaffin and at least one cycloparaffin.

Other features and advantages of the present disclosure will become readily appreciated as the same becomes better understood after reading the following description.

DETAILED DESCRIPTION

Figure 1:
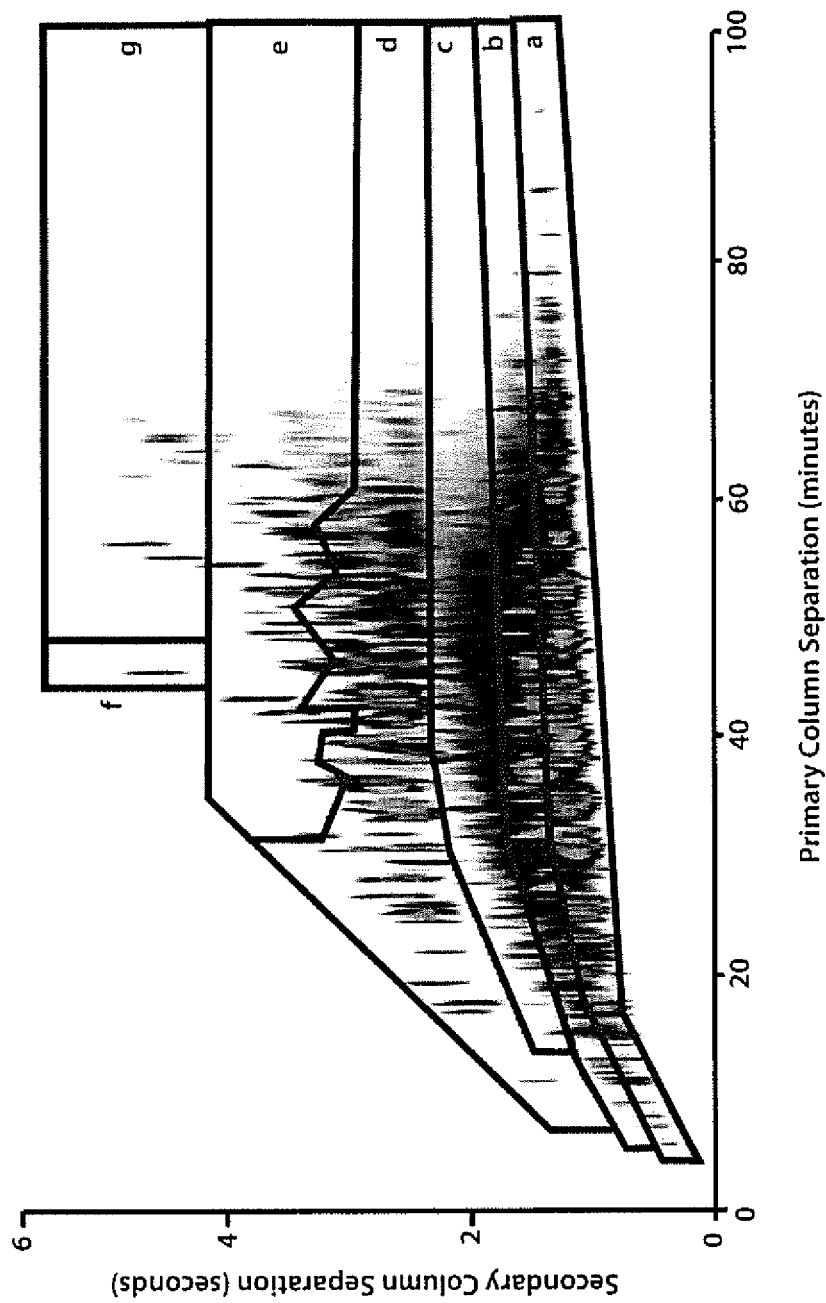
FIG. 1 is an example GC×GC chromatogram (FID detection) of a jet fuel with the primary axis separation by a non-polar column and the secondary axis separation by a polar column, with section identifications: a) n-, iso-paraffins; b) monocycloparaffins, c) dicycloparaffins, d) alkylbenzenes, e) indans and tetralins, f) naphthalene, and g) alkylnaphthalenes, and response given in arbitrary volume units.

The rocket propellants of this disclosure exhibit very good thermal stability, while at the same time having both a high specific energy and a high mass density. This combination of properties, which has not coexisted in previously known fuels, makes the fuels of this disclosure useful for generally any launch vehicle employing rocket propulsion, and especially useful for launch vehicles utilizing regenerative cooling to transfer heat away from rocket engine components, such as the combustion chamber and engine nozzle. The disclosed fuels are particularly useful for reusable launch vehicles in which the rocket engines are operated both during ascent of the launch vehicle, and during a controlled descent and powered landing. The high mass density of the fuel allows a higher mass of fuel to be stored in a given volume, while the high energy density allows more energy to be released per unit of mass of the fuel during engine operation. The excellent thermal stability of the fuel allows the rocket engines to be operated for a longer period of time without overheating or loosing performance when regenerative cooling is employed.

While the rocket propellants are particularly useful for facilitating controlled, soft landings of reusable launch vehicles employing regenerative cooling of rocket engine components, the disclosed fuels can also be advantageously employed for single use launch vehicles, either employing or not employing regenerative cooling, as well as reusable launch vehicles that do not employ regenerative cooling. The disclosed fuels may also be advantageously employed to propel air-breathing hypersonic vehicles or other air-breathing supersonic vehicles in which the fuel is used as a coolant for engine components and/or airframe structures.

The fuels disclosed herein may also be characterized as producing a high specific impulse during combustion.

The specific impulse ($I_{sp}$) is a performance measure for rocket propellants that is equal to units of thrust produced during ejection of exhaust gases from a rocket engine per unit weight of propellant consumed per unit of time, and therefore specific impulse is measured in units of time (e.g., seconds). $I_{sp}$ can be used to determine the payload that a rocket can carry into orbit. Propellants with a higher specific impulse are desirable in order to deliver a payload into a desired orbit at a minimum cost. It is also desirable that the fuel burns or combusts cleanly and does not form deposits when a portion of the fuel is used for driving a turbine to operate a pump to deliver the fuel to the rocket engine.

Rocket scientists have determined that the specific impulse can be calculated from the equation:

$$I_{sp} = 9.80 \sqrt{\frac{T_c}{M}} \sqrt{\frac{k}{k-1}} \sqrt{1 - \left(\frac{P_e}{P_c}\right)^{\frac{k-1}{k}}}$$

Where,

M=a weighted average of the molecular weights of the combustion products $T_c$ is the combustion chamber temperature in degrees Rankine $k=C_p/C_v$ is the ratio of specific heats of the combustion products $P_e/P_o$=ratio of external pressure to combustion chamber pressure Therefore, to achieve highest $I_{sp}$ it is desirable to have a high combustion temperature (high net heat of combustion) and have combustion products with a lowest possible molecular weight. For example, maximum $I_{sp}$ for any liquid propellant is provided by liquid hydrogen fuel, with oxygen as oxidant, because the product of combustion is only water (M=18). In contrast, a hydrocarbon fuel results in combustion products comprising $CO_2$ (M=44), CO (M=28) and water. Therefore, to maximize $I_{sp}$, the hydrocarbon fuel must have a high hydrogen content (i.e. a high H/C atomic ratio) and it must burn such that $CO_2$ formation and unburned hydrocarbons are minimized. To minimize $CO_2$ generation and maximize carbon monoxide generation, the rocket engine is designed to combust the fuel under fuel rich conditions.

The disclosed formulations are capable of producing a higher $I_{sp}$ than that provided by a conventional petroleum based refined kerosene called RP-1. The RP-1 specifications were developed for military purposes as MIL-P25576 in 1957 and set a broad criterion for propellant properties with higher density, cleaner burning, ease of handling and performance relative to kerosene jet fuel. Commercially available RP-1 fuels are limited to a hydrogen content of about 14 wt. %, a hydrogen to carbon atomic ratio (H/C) less than 2.0, a heat of combustion less than 18.7 KBtu/lb and can have up to 5 percent by volume aromatics and 2 percent by volume olefins. This conventional RP-1 fuel can also contain up to 30 ppm (weight basis) sulfur. The aromatics and olefins can cause deposits and coke formation in the cooling chambers and sulfur can cause rapid corrosion.

The fuels disclosed herein have a relatively high mass density (specific gravity) that is greater than 0.8150 grams per cubic centimeter (g/cc) at 20° C. In certain embodiments, the mass density is about 0.835 g/cc at 20° C. (i.e., from 0.830 to 0.840 g/cc).

The disclosed fuels have an aromatics content that is 0.5% by mass or less. This very low aromatics content is needed, or at least highly desirable, to achieve excellent thermal stability that avoids degradation and the accompanying coking of the walls of regenerative cooling tubes or channels.

The fuels disclosed herein have a specific energy (i.e., the net heat of combustion per unit of mass) of 18.4 KBtu/lb or greater. More importantly, the disclosed fuels have a volumetric heat of combustion (i.e., energy per unit of volume of fuel) that is about 3% greater than RP-1 rocket fuel.

The fuels disclosed herein are generally characterized as having a cycloparaffin content of 60 mass percent or higher. A relatively high cycloparaffin content is desirable to achieve a high hydrogen content and specific energy, while also achieving a high mass density, and while also maintaining excellent thermal stability. It is believed that this combination of properties is unexpected. Rather than providing excellent thermal stability, a high cycloparaffin content might have been expected to reduce thermal stability, as the cycloparaffins would be expected to lose hydrogen atoms during exposure to high temperatures and possibly form aromatics that are susceptible to further degradation and coke formation.

Desirably, the disclosed fuels can have a sulfur content that is less than 1 ppm by mass.

The rocket propellants disclosed herein can be prepared by blending a refined kerosene (a light fuel oil obtained by distillation of petroleum) having a low aromatics content and a relatively high cycloparaffin content with at least one isoparaffin, at least one cycloparaffin, or at least one isoparaffin and at least one cycloparaffin, providing a fuel composition having a total aromatics content less than or equal to 0.5 mass percent, a specific energy of 18.5 KBtu/lb or greater, and a mass density of 0.82 glee or greater. Examples of isoparaffins that can be blended with a highly naphthenic refined kerosene include isododecane and isoeicosane. Examples of cycloparaffins that can be blended with a highly naphthenic refined kerosene include decalin, diethylcyclohexane and exo-tetrahydrodicyclopentadiene.

The following examples and comparisons are intended to illustrate characteristics and advantages of the disclosed rocket propellants, and do not limit the scope of the claims, which, whenever possible, should be interpreted without reference to the examples.

The thermal stability of fuel compositions (rocket propellants) in accordance with this disclosure were compared with conventional (commercially available) rocket fuels.

Three conventional fuels (Blends 1, 2 and 3) were characterized and tested, along with two fuels in accordance with different aspects of this disclosure (Blends 4 and 5), and Blend 6, which was substantially pure diethylcyclohexane.

The fuels (Blends 1-6) were characterized using two-dimensional gas chromatography (GC×GC).

This technique was conducted using an Agilent 5975 GC-MS system equipped with Capillary Flow Technology (GFT) flow modulation. A 20-meter, DB-5MS, 0.18-mm ID primary column and a 5-meter, DB-17MS, 0.25-mm ID secondary column were used. A programming rate of 1.5° C./minute was used to obtain the primary separation, and a six second modulation time was chosen. Data were evaluated using GC Image software (Zoex, version 2.2b0). Both FID and MS data were taken simultaneously, using post-column splitting and short transfer lines to each detector. The primary column flow rate used was 0.4 mL/min, and the secondary column flow was 36 mL/min. This high flow through the secondary column allowed peaks from the polar column to be relatively narrow compared to other flows examined. A template was developed for sample evaluation by close examination of MS results, and subsequent translation to the co-generated FID file. These templates, or two dimensional boundaries can be shown in simplified form in FIG. 1, and generally include the following hydrocarbon classes: paraffins (iso- and normal-paraffins), monocycloparaffins, dicycloparaffins, alkylbenzenes, indans and tetralins, naphthalene and alkyl naphthalenes. In the specific analyses conducted here, more categories and specifics have been added to be able to quantify, not only the major classes, but also the carbon distribution within each class. Quantification of these classes was performed by the total FID response of the compounds in each hydrocarbon class, as FID has been shown to respond consistently by number of carbons for a wide range of hydrocarbons.

The data generated for the 6 samples are summarized in Table 1. The table contains aromatic data from the analysis, basically showing a lack of aromatic compounds from these samples. The second part of the table gives the aliphatic results, shown by isoparaffins, n-alkanes, monocycloparaffins and dicycloparaffins, mainly. The n-alkane concentrations shown were all below 3% (total, by weight) for these 6 samples and the tricycloparaffin content was less than 2%.

Carbon number speciation was based on the number of carbons within a class and estimates of the molecular formula and molecular weight, which are useful in performing combustion calculations. The molecular weight estimates range from 140 to 191 g/mol. Several of the blends have just a few components, while others are complex mixtures. Highly branched isoparaffinic compounds such as those shown in Blend #4, were evaluated separately, as their severe branching tends to cause early elution compared to conventional mono- or di-branched compounds. Low levels of normal alkanes from these samples are verified by using conventional GC-MS analyses.

TABLE 1

| Summary of Blends 1 through 6: Part 1, aromatic results, | | | | | | |
|---|---|---|---|---|---|---|
| | Blend #1 Weight % | Blend #2 Weight % | Blend #3 Weight % | Blend #4 Weight % | Blend #5 Weight % | Blend #6 Weight % |
| Aromatics | | | | | | |
| Alkylbenzenes | | | | | | |
| benzene (C06) | <0.01 | <0.01 | <0.01 | <0.01 | <0.01 | <0.01 |
| toluene (C07) | <0.01 | <0.01 | <0.01 | <0.01 | <0.01 | <0.01 |
| C2-benzene (C08) | <0.01 | <0.01 | <0.01 | <0.01 | <0.01 | <0.01 |
| C3-benzene (C09) | <0.01 | <0.01 | 0.02 | <0.01 | <0.01 | <0.01 |
| C4-benzene (C10) | 0.02 | 0.04 | 0.05 | <0.01 | <0.01 | <0.01 |
| C5-benzene (C11) | 0.01 | 0.02 | 0.04 | <0.01 | <0.01 | <0.01 |
| C6-benzene (C12) | <0.01 | <0.01 | 0.01 | <0.01 | <0.01 | <0.01 |
| C7-benzene (C13) | 0.03 | 0.02 | 0.03 | 0.02 | 0.02 | <0.01 |
| C8-benzene (C14) | <0.01 | 0.01 | <0.01 | <0.01 | 0.06 | <0.01 |
| C9+-benzene (C15+) | 0.03 | 0.02 | 0.03 | 0.04 | 0.03 | <0.01 |
| Total Alkylbenzenes | 0.10 | 0.13 | 0.17 | 0.07 | 0.12 | <0.01 |
| Diaromatics | | | | | | |
| (Naphthalenes, Biphenyl, etc.) | | | | | | |
| diaromatic-C10 | <0.01 | <0.01 | <0.01 | <0.01 | <0.01 | <0.01 |
| diaromatic-C11 | <0.01 | <0.01 | <0.01 | <0.01 | <0.01 | <0.01 |
| diaromatic-C12 | <0.01 | <0.01 | <0.01 | <0.01 | <0.01 | <0.01 |
| diaromatic-C13 | <0.01 | <0.01 | <0.01 | <0.01 | <0.01 | <0.01 |
| diaromatic-C14+ | <0.01 | <0.01 | <0.01 | <0.01 | <0.01 | <0.01 |
| Total Alkylnaphthalenes | <0.01 | <0.01 | <0.01 | <0.01 | <0.01 | <0.01 |
| Cycloaromatics | | | | | | |
| (Indans, Tetralins, etc.) | | | | | | |
| cycloaromatic-C09 | <0.01 | <0.01 | <0.01 | <0.01 | <0.01 | <0.01 |
| cycloaromatic-C10 | <0.01 | <0.01 | <0.01 | <0.01 | <0.01 | <0.01 |
| cycloaromatic-C11 | <0.01 | 0.02 | 0.03 | <0.01 | 0.01 | <0.01 |
| cycloaromatic-C12 | 0.05 | 0.05 | 0.06 | 0.01 | 0.05 | <0.01 |

TABLE 1-continued

Summary of Blends 1 through 6: Part 1, aromatic results.

|  | Blend #1 Weight % | Blend #2 Weight % | Blend #3 Weight % | Blend #4 Weight % | Blend #5 Weight % | Blend #6 Weight % |
|---|---|---|---|---|---|---|
| cycloaromatic-C13 | 0.09 | 0.06 | 0.05 | 0.03 | 0.06 | <0.01 |
| cycloaromatic-C14 | 0.07 | 0.05 | 0.03 | 0.02 | 0.04 | <0.01 |
| cycloaromatics-C15+ | 0.03 | 0.02 | 0.01 | 0.02 | 0.03 | <0.01 |
| Total Cycloaromatics | 0.24 | 0.21 | 0.20 | 0.08 | 0.20 | <0.01 |
| Total Aromatics | 0.35 | 0.34 | 0.37 | 0.15 | 0.33 | <0.01 |
| Paraffins iso-Paraffins |  |  |  |  |  |  |
| C07 and lower-iso | <0.01 | <0.01 | <0.01 | <0.01 | <0.01 | <0.01 |
| C08-isoparaffins | <0.01 | <0.01 | 0.04 | 0.01 | <0.01 | <0.01 |
| C09-isoparaffins | <0.01 | <0.01 | 0.41 | <0.01 | <0.01 | <0.01 |
| C10-isoparaffins | 1.77 | 1.50 | 3.29 | 0.18 | 0.01 | <0.01 |
| C11-isoparaffins | 6.95 | 6.63 | 5.21 | 1.01 | 0.22 | <0.01 |
| C12-isoparaffins | 8.52 | 9.56 | 6.42 | 10.82 | 0.86 | <0.01 |
| C13-isoparaffins | 7.47 | 8.28 | 7.79 | 3.17 | 4.61 | <0.01 |
| C14-isoparaffins | 6.66 | 7.03 | 8.77 | 8.65 | 10.56 | <0.01 |
| C15-isoparaffins | 4.31 | 3.66 | 5.12 | 2.79 | 10.24 | <0.01 |
| C16-isoparaffins | 1.19 | 0.78 | 1.11 | 34.44 | 3.69 | <0.01 |
| C17-isoparaffins | 0.31 | 0.18 | 0.24 | 0.70 | 0.71 | <0.01 |
| C18-isoparaffins | 0.11 | 0.06 | 0.07 | 0.27 | 0.17 | <0.01 |
| C19-isoparaffins | 0.03 | <0.01 | <0.01 | 0.14 | 0.02 | <0.01 |
| C20-isoparaffins | 0.01 | <0.01 | <0.01 | 4.16 | <0.01 | <0.01 |
| C21-isoparaffins | <0.01 | <0.01 | <0.01 | 0.02 | <0.01 | <0.01 |
| C22-isoparaffins | <0.01 | <0.01 | <0.01 | <0.01 | <0.01 | <0.01 |
| C23-isoparaffins | <0.01 | <0.01 | <0.01 | <0.01 | <0.01 | <0.01 |
| C24-isoparaffins | <0.01 | <0.01 | <0.01 | <0.01 | <0.01 | <0.01 |
| Total iso-Paraffins | 37.35 | 37.70 | 38.50 | 66.38 | 31.09 | <0.01 |
| n-Paraffins |  |  |  |  |  |  |
| n-C07 | <0.01 | <0.01 | <0.01 | <0.01 | <0.01 | <0.01 |
| n-C08 | <0.01 | <0.01 | 0.06 | <0.01 | <0.01 | <0.01 |
| n-C09 | 0.02 | 0.02 | 0.68 | <0.01 | <0.01 | <0.01 |
| n-C10 | 0.18 | 0.19 | 1.16 | 0.02 | 0.02 | <0.01 |
| n-C11 | 1.18 | 1.25 | 0.56 | 0.04 | 0.12 | <0.01 |
| n-C12 | 0.84 | 0.92 | 0.40 | 0.08 | 0.26 | <0.01 |
| n-C13 | 0.11 | 0.12 | 0.10 | 0.02 | 0.49 | <0.01 |
| n-C14 | 0.03 | 0.02 | 0.04 | 0.01 | 0.41 | <0.01 |
| n-C15 | 0.01 | <0.01 | 0.01 | 0.01 | 0.25 | <0.01 |
| n-C16 | <0.01 | <0.01 | <0.01 | 0.01 | 0.04 | <0.01 |
| n-C17 | <0.01 | <0.01 | <0.01 | <0.01 | <0.01 | <0.01 |
| n-C18 | <0.01 | <0.01 | <0.01 | <0.01 | <0.01 | <0.01 |
| n-C19 | <0.01 | <0.01 | <0.01 | <0.01 | <0.01 | <0.01 |
| n-C20 | <0.01 | <0.01 | <0.01 | <0.01 | <0.01 | <0.01 |
| n-C21 | <0.01 | <0.01 | <0.01 | <0.01 | <0.01 | <0.01 |
| n-C22 | <0.01 | <0.01 | <0.01 | <0.01 | <0.01 | <0.01 |
| n-C23 | <0.01 | <0.01 | <0.01 | <0.01 | <0.01 | <0.01 |
| Total n-Paraffins | 2.38 | 2.52 | 3.01 | 0.20 | 1.60 | <0.01 |
| Cycloparaffins Monocycloparaffins |  |  |  |  |  |  |
| C1-monocyclo (C07) | <0.01 | <0.01 | <0.01 | <0.01 | <0.01 | <0.01 |
| C2-monocyclo (C08) | 0.12 | 0.10 | 0.22 | 0.01 | <0.01 | 0.09 |
| C3-monocyclo (C09) | 1.68 | 1.38 | 1.54 | 0.17 | <0.01 | 3.05 |
| C4-monocyclo (C10) | 6.72 | 5.77 | 4.02 | 0.72 | 0.07 | 96.50 |
| C5-monocyclo (C11) | 9.20 | 10.20 | 6.74 | 1.75 | 0.39 | 0.28 |
| C6-monocyclo (C12) | 7.29 | 8.37 | 7.65 | 2.73 | 2.91 | <0.01 |
| C7-monocyclo (C13) | 6.73 | 6.95 | 8.18 | 2.97 | 6.01 | <0.01 |
| C8-monocyclo (C14) | 4.33 | 3.64 | 4.88 | 1.25 | 5.70 | <0.01 |
| C9-monocyclo (C15) | 2.13 | 1.48 | 2.21 | 1.75 | 3.47 | <0.01 |
| C10-monocyclo (C16) | 0.46 | 0.29 | 0.40 | 0.06 | 0.68 | <0.01 |
| C11-monocyclo (C17) | 0.10 | 0.05 | 0.08 | 0.20 | 0.16 | <0.01 |
| C12-monocyclo (C18) | 0.02 | <0.01 | <0.01 | 0.03 | 0.02 | <0.01 |
| C13+-monocyclo (C19+) | <0.01 | <0.01 | <0.01 | 0.06 | <0.01 | <0.01 |
| Total Monocycloparaffins | 38.78 | 38.24 | 35.94 | 11.70 | 19.41 | 99.93 |
| Dicycloparaffins (Decalins, Bihexyls, etc.) |  |  |  |  |  |  |
| C08-dicycloparaffins | <0.01 | <0.01 | <0.01 | <0.01 | <0.01 | <0.01 |
| C09-dicycloparaffins | 0.08 | 0.19 | 0.15 | 0.04 | <0.01 | 0.05 |
| C10-dicycloparaffins | 1.60 | 1.78 | 1.15 | 11.08 | 30.34 | <0.01 |

TABLE 1-continued

Summary of Blends 1 through 6: Part 1, aromatic results.

|  | Blend #1 Weight % | Blend #2 Weight % | Blend #3 Weight % | Blend #4 Weight % | Blend #5 Weight % | Blend #6 Weight % |
|---|---|---|---|---|---|---|
| C11-dicycloparaffins | 4.16 | 4.41 | 3.53 | 1.14 | 0.72 | <0.01 |
| C12-dicycloparaffins | 4.76 | 5.18 | 5.30 | 2.27 | 2.88 | <0.01 |
| C13-dicycloparaffins | 5.04 | 4.92 | 6.19 | 2.90 | 5.87 | <0.01 |
| C14-dicycloparaffins | 1.99 | 1.50 | 2.22 | 1.07 | 3.37 | <0.01 |
| C15-dicycloparaffins | 1.79 | 1.39 | 1.93 | 0.98 | 3.06 | <0.01 |
| C16-dicycloparaffins | 0.06 | 0.03 | 0.03 | 0.05 | 0.15 | <0.01 |
| C17+-dicycloparaffins | 0.02 | 0.01 | 0.02 | 0.05 | 0.03 | <0.01 |
| Total Dicycloparaffins | 19.50 | 19.40 | 20.51 | 19.58 | 46.44 | 0.07 |
| Tricycloparaffins | | | | | | |
| C10-tricycloparaffins | 0.07 | 0.08 | 0.05 | 0.01 | <0.01 | <0.01 |
| C11-tricycloparaffins | 0.30 | 0.34 | 0.11 | 0.10 | 0.03 | <0.01 |
| C12-tricycloparaffins | 0.77 | 0.81 | 0.76 | 0.34 | 0.29 | <0.01 |
| C13-tricycloparaffins | 0.41 | 0.51 | 0.65 | 0.31 | 0.48 | <0.01 |
| C14-tricycloparaffins | 0.06 | 0.04 | 0.07 | 0.05 | 0.17 | <0.01 |
| C15-tricycloparaffins | 0.01 | <0.01 | 0.01 | <0.01 | 0.09 | <0.01 |
| C16-tricycloparaffins | 0.01 | <0.01 | <0.01 | 0.02 | 0.06 | <0.01 |
| C17-tricycloparaffins | <0.01 | <0.01 | <0.01 | 0.02 | 0.02 | <0.01 |
| Total Tricycloparaffins | 1.64 | 1.80 | 1.66 | 0.85 | 1.14 | <0.01 |
| Total Cycloparaffins | 59.93 | 59.44 | 58.11 | 32.13 | 66.98 | 100.00 |

Heat stability tests were performed on each of Blends 1-6 by flowing the fuels through a tube under the conditions shown in Table 2.

TABLE 2

"STANDARD" RUN CONDITION

| Mass flowrate | 5.36 (2.43) | lbm/min (kg/min) |
| Back Pressure | 1000 (6.9) | psi (MPa) |
| Test Article I.D. | 0.036 (0.91) | inches (mm) |
| Test Article O.D. | 0.125 (3.18) | inches(mm) |
| Heated Length | 4 (10.2) | inches (mm) |
| Total Length | 12 (30.5) | inches (mm) |
| Input Power | 4500 | Watts |
| Duration | 15 | minutes |
| Nominal Heatflux | 9.4 (15.4) | BTU/in$^2$s (MW/m$^2$) | a 5 gal pail of fuel can provide 2 CRAFTI runs of the "standard" condition.

Figure 2:
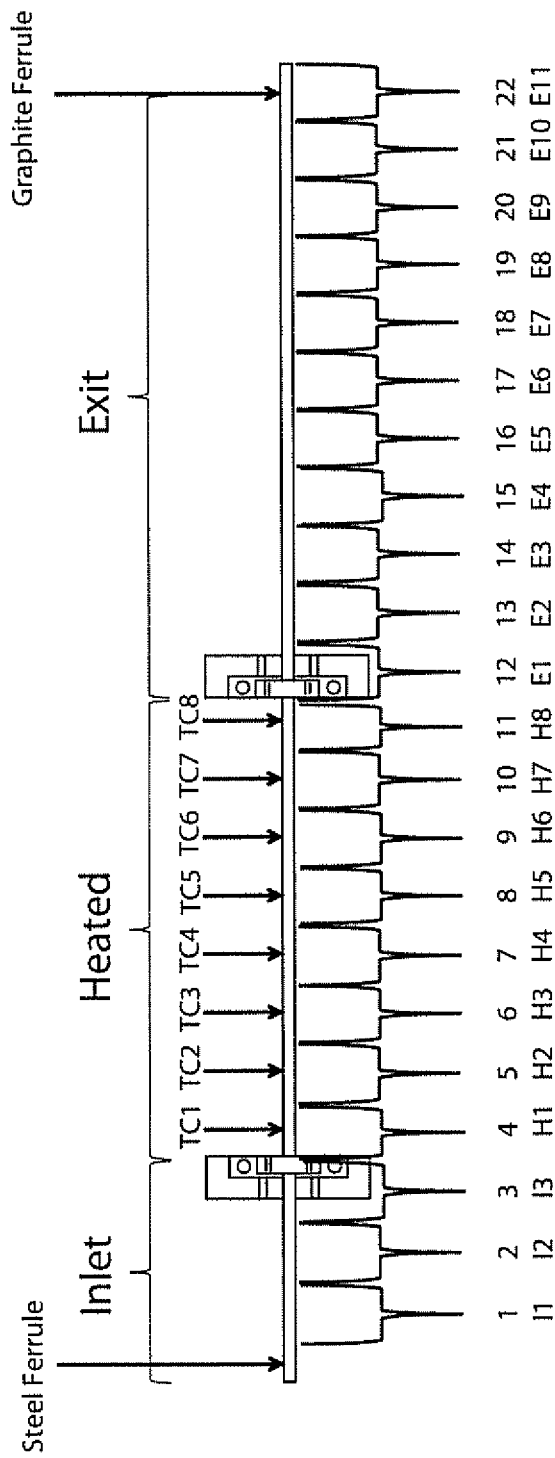
FIG. 2 is a schematic illustration of a test apparatus used to evaluate thermal stability of hydrocarbon fuels.

Mass flow rate was controlled by a positive displacement continuous flow syringe pump. Back pressure was determined using inlet and outlet pressure transducers. The tube used for testing included a 2 inch unheated inlet region, a 4 inch resistively heated region and a 6 inch unheated exit region. This arrangement is illustrated selectively in FIG. 2. The external wall temperature of the tube was measured every 0.5 inches along the length of the heated region at locations designated TC1, TC2, TC3, TC4, TC5, TC6, TC7 and TC8 in FIG. 2.

Thermal stability was characterized by pressure drop (a measure of accumulated carbon deposition on the internal walls of the tube), overall heat transfer coefficient (a metric of fuel cooling performance capability), and measured carbon removed from the tube.

Figure 3:
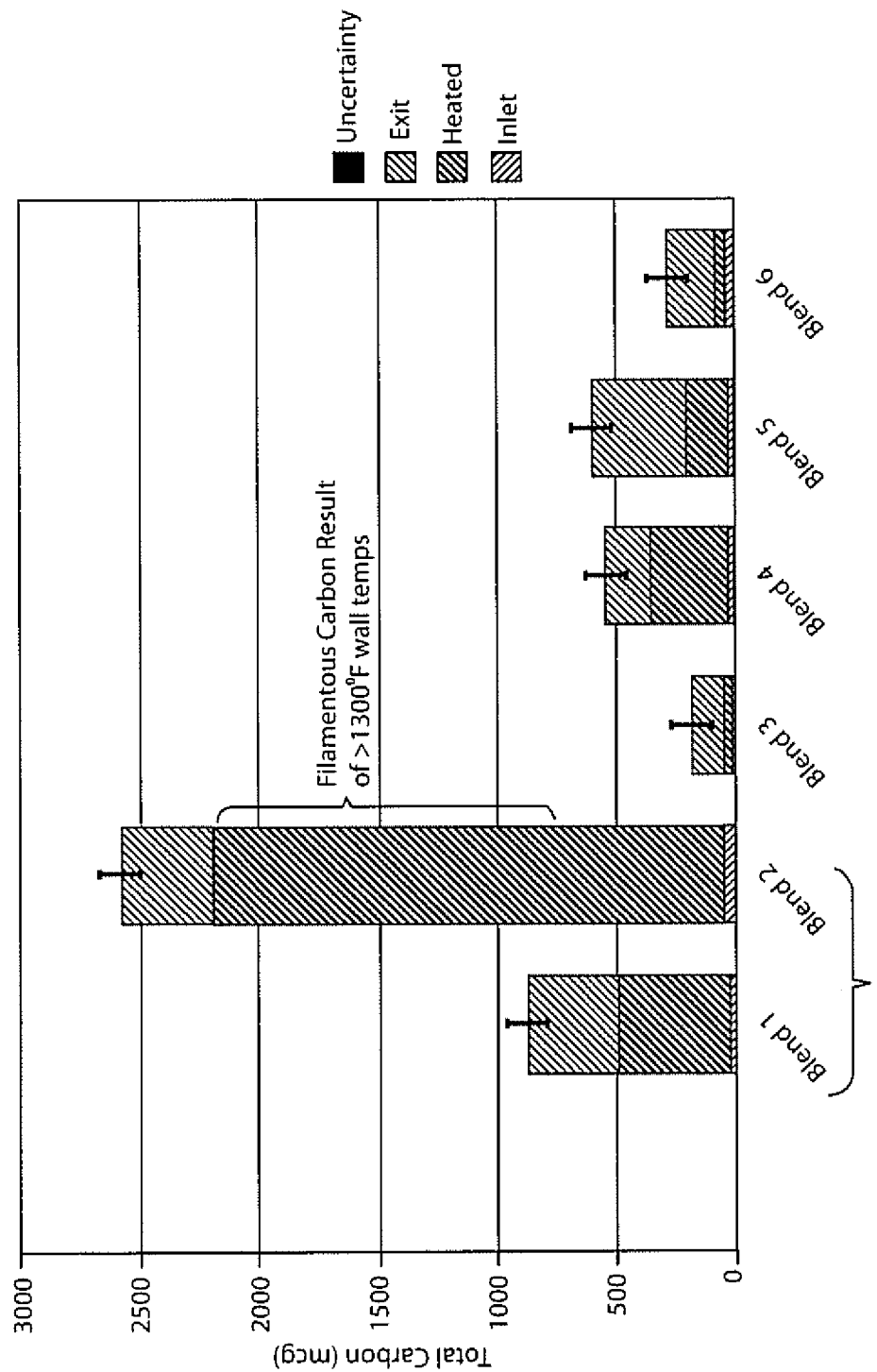
FIG. 3 is a graphical comparison of total carbon produced on the tube walls during testing for Blends 1-6.

FIG. 3 shows that Blends 4 and 5 (in accordance with this disclosure) produce less carbon when exposed to high temperature than conventional fuels (Blends 1 and 2). Conventional fuel Blend 3 exhibits good thermal stability (produces little coke), but has a low mass density of only 0.81 g/cc.

Figure 4:
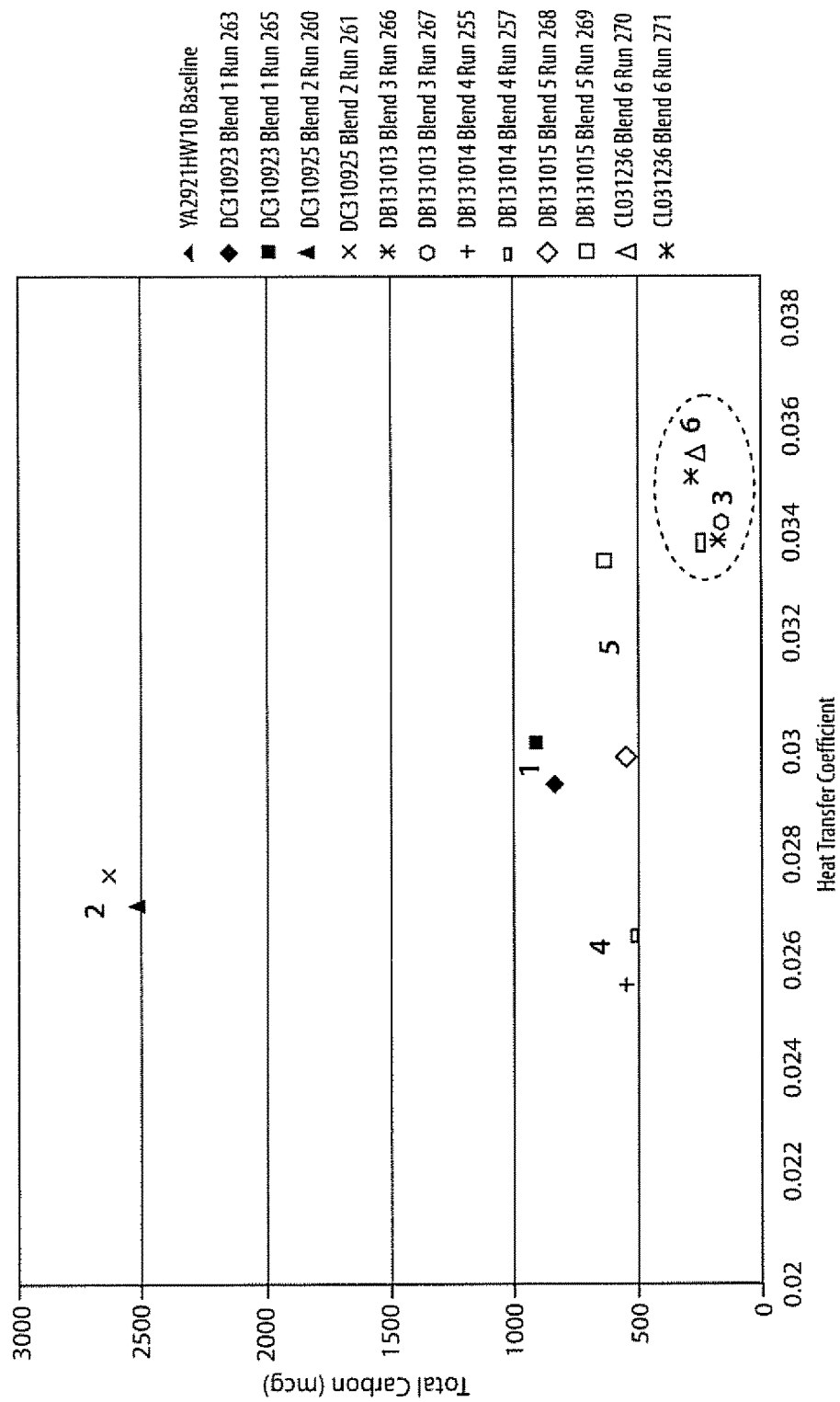
FIG. 4 is a graphical representation of heat transfer performance versus total carbon.

FIG. 4 shows that only Blends 3 and 6 exhibit both very low coking (degradation) and high heat transfer coefficient.

The results show that diethylcyclohexane (Blend 6) exhibits good coking characteristics (i.e., resistance to degradation) and is therefore a desirable component for producing the high density, high cycloparaffinic content fuel of this disclosure.

The described embodiments are not limiting. Various modifications are considered within the purview and scope of the appended claims.

What is claimed is:

1. A rocket propellant comprising:
   a hydrocarbon blend of a refined kerosene obtained by distillation of petroleum and at least one of an isoparaffin and a cycloparaffin, wherein the hydrocarbon blend has an aromatic compounds content less than 0.5 mass percent, a cycloparaffin content of at least 60 mass percent, a specific energy of 18.4 KBtu/lb or greater, and a mass density from 0.830 grams per cubic centimeter at 20° C. to 0.840 grams per cubic centimeter at 20° C.

2. The rocket propellant of claim 1 having a sulfur content less than 1 ppm by mass.

3. The rocket propellant of claim 1 which comprises a blend of a refined kerosene and at least one isoparaffin.

4. The rocket propellant of claim 3, in which the isoparaffin is at least one of the group consisting of isododecane and isoeicosane.

5. The rocket propellant of claim 1, in which the hydrocarbon blend comprises a refined kerosene, and at least one cycloparaffin.

6. The rocket propellant of claim 5, in which the cycloparaffin is at least one of the group consisting of decalin, diethyl cyclohexane, and exo-tetrahydrodicyclopentadiene.

7. The rocket propellant of claim 1, in which the hydrocarbon blend comprises a refined kerosene, at least one isoparaffin, and at least one cycloparaffin.

8. The rocket propellant of claim 7, in which the isoparaffin is at least one of the group consisting of isododecane and isoeicosane.

9. The rocket propellant of claim 7, in which the cycloparaffin is at least one of the group consisting of decalin, diethyl cyclohexane, and exo-tetrahydrodicyclopentadiene.

10. The rocket propellant of claim 7, in which the isoparaffin is at least one of the group consisting of isododecane and isoeicosane and in which the cycloparaffin is at least one of the group consisting of decalin, diethyl cyclohexane, and exo-tetrahydrodicyclopentadiene.

11. The rocket propellant of claim 1, having a mass density of about 0.835, and in which the hydrocarbon blend comprises a refined kerosene and decalin.

\* \* \* \* \*